United States Patent [19]

Dean et al.

[11] Patent Number: 4,749,253

[45] Date of Patent: Jun. 7, 1988

[54] FIBER OPTIC CONNECTOR

[75] Inventors: David L. Dean; Michael de Jong, both of Hickory, N.C.

[73] Assignee: Siecor Corporation, Hickory, N.C.

[21] Appl. No.: 17,789

[22] Filed: Feb. 24, 1987

[51] Int. Cl.⁴ .............................................. G02B 6/38
[52] U.S. Cl. ................................ 350/96.21; 350/96.2
[58] Field of Search ........................... 350/96.2, 96.21

[56] References Cited

U.S. PATENT DOCUMENTS

| | | | |
|---|---|---|---|
| 2,298,676 | 10/1942 | Camp | 156/158 |
| 3,928,102 | 12/1975 | Rowe et al. | 156/158 |
| 3,989,567 | 11/1976 | Tardy | 156/158 |
| 4,019,241 | 4/1977 | Logan | 29/407 |
| 4,129,932 | 12/1978 | Stancati | 350/96.21 X |
| 4,179,186 | 12/1979 | Tynes | 350/96.21 |
| 4,192,575 | 3/1980 | Hodge | 350/96.21 |
| 4,196,032 | 4/1980 | Eggleston | 156/158 |
| 4,353,619 | 10/1982 | Parr | 350/96.21 |
| 4,486,072 | 12/1984 | Roberts | 350/96.21 |
| 4,490,007 | 12/1984 | Murata | 350/96.21 |
| 4,544,231 | 10/1985 | Peterson | 350/96.2 X |
| 4,544,234 | 10/1985 | De veau et al. | 350/96.21 |

OTHER PUBLICATIONS

Hodge, Malcom H. "A Low Loss Single Fiber Connector Alignment Guide," *Fiber Optic and Communications Proceedings,* pp. 42–47 (1978).

Woods, John G. "Single Mode Fiber Optic Connectors and Splices," SPIE vol. 479, *Fiber Optic Couplers, Connectors, and Splice Technology,* pp. 42–47 (1984).

*Primary Examiner*—John Lee
*Assistant Examiner*—John Ngo
*Attorney, Agent, or Firm*—J. David Abernethy

[57] ABSTRACT

A single fiber optical connector with a tube holding two first rods. A curve is induced into optical fibers by force provided by tapered ends of two second rods resting on the first rods. The curve causes the optical fibers to rest in a groove formed by the first rods for splicing.

2 Claims, 2 Drawing Sheets

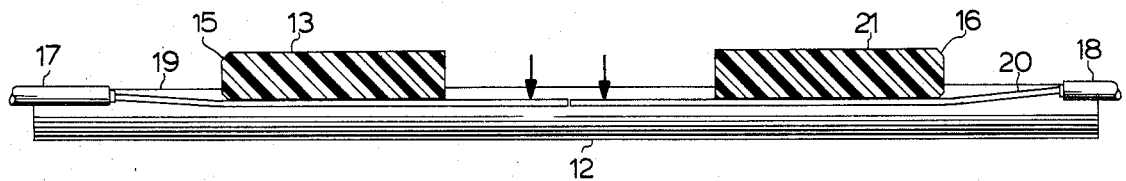
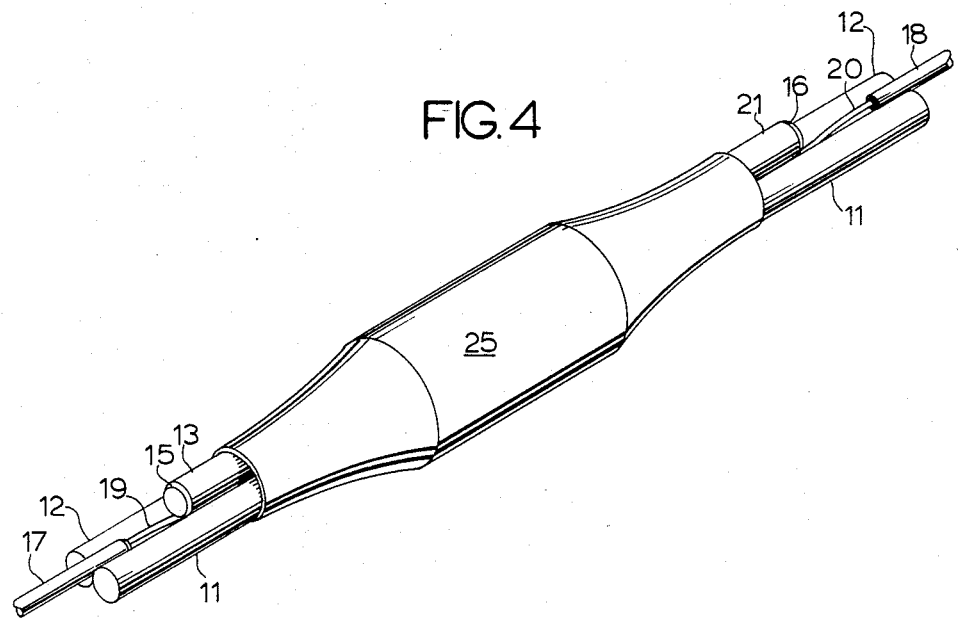

FIBER OPTIC CONNECTOR

BACKGROUND OF THE INVENTION

1. Field of the invention

The invention is directed to the field of connectors for elongated members, principally optical fibers.

2. Description of the Prior Art

Fiber optic communication applications often require the capability to join, or splice, separate optical fiber free ends. Typical designs include holding the fiber ends within the interspace framed by three rods, laying the fiber free ends within a closed v-shaped groove, or the like.

A variation of interest is found in an article by Dr. Malcom H. Hodge, "A Low Loss Single Fiber Connector Alignment Guide," Fiber Optic and Communications Proceedings, pp. 42–47 (1978). Hodge proposed placing optical fibers into rod groups having bends or curves therein in order to place a transverse force on the optical fiber free end. This in turn tends to cause the free end to rest in a groove in the direction of this force.

Another variation of interest is using an adhesive which is curable by being exposed to ultraviolet radiation in an optical fiber connector. Such an adhesive is herein referred to as ultraviolet curable cement. An example of its use may be found in U.S. Pat. No. 4,544,234, to DeVeau, Jr., incorporated herein by reference.

SUMMARY OF THE INVENTION

The alignment guide described by Hodge requires the use of curved rods, whose shapes must be made to specifications. Applicants believe that a connector whose components are standard items, such as a tube, tapered rods, and optical fibers in buffer tubes would better use transverse fiber forces. The present invention induces a bend in the fiber by removing a portion of the buffer tube of an optical fiber and placing the buffer tube in a groove formed by two first rods. The fiber is therefore a short distance, the buffer tube diameter, above the groove. A second rod with a tapered end also rests in the groove. The optical fiber is placed through the interspace formed by the second rod and the two first rods, the fiber being curved by the tapered end of the second rod. Two fibers so curved are abutted end to end within a tube holding the rods for splicing. Force caused by the curve in the fiber keeps the fiber ends within the groove during splicing, tending to align them for proper signal transmission.

Objects of the invention include providing a simple optical connector using only two rods at the splice point, avoiding any "pistoning" air pressure problem which may sometimes occur when three rods are used at the splice point. Force supplied by curving the fiber removes the need for a third rod at the splice point for proper alignment.

BRIEF DESCRIPTION OF THE DRAWINGS

FIG. 3 is a sectional view of the connector along line 3—3 of FIG. 1 with the tube removed; and FIG. 4 is a perspective view of the connector including a contractible member.

DETAILED DESCRIPTION OF THE PREFERRED EMBODIMENT

Figure 1:
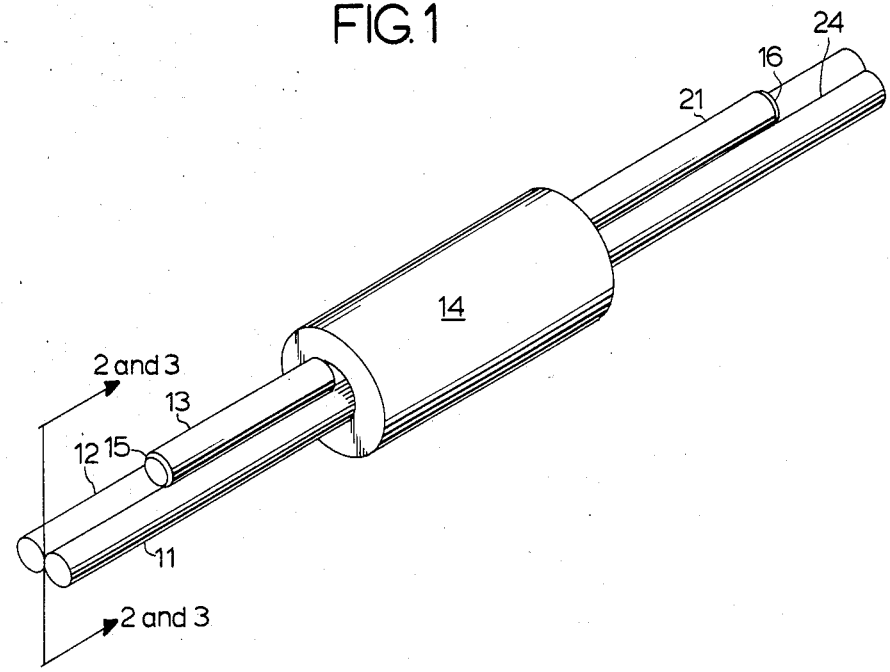
FIG. 1 is a perspective view of the connector with the contractible member removed.

Referring to the drawings, FIG. 1 shows tube 14, which has an unperforated wall. Extending through tube 14 are first rods 11, 12. First rods 11, 12 are laid side by side in order that the outer surfaces of first rods 11, 12 form a groove 24 therebetween.

Second rods 13, 21 are disposed in groove 24 outside tube 14 on opposite sides of tube 14. Ends 15, 16, of second rods 13, 21 are tapered. Ends 15, 16 of second rods 13, 21 are the ends farthest from the tube.

Figure 2:
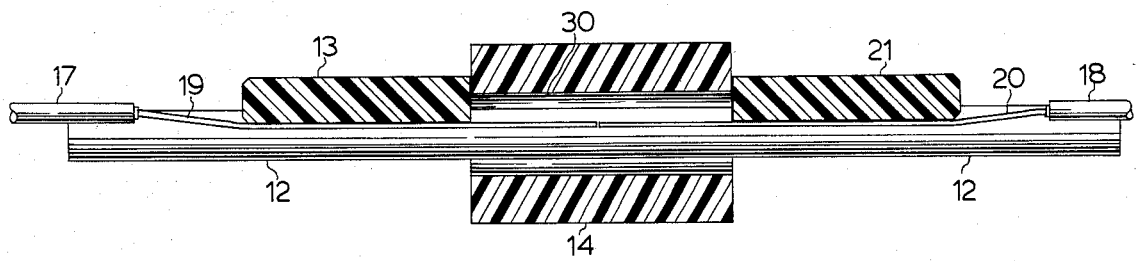
FIG. 2 is a sectional view of the connector along line 2—2 of FIG. 1.

FIGS. 2 and 3 then show how optical fibers are placed within the connector. Optical fiber 19 emerges from buffer tube 17, and optical fiber 20 emerges from buffer tube 18. Optical fibers 19, 20 pass under tapered rod ends 15, 16, respectively, into groove 24. The optical fiber ends are pushed along groove 24 until they abut in tube 14.

Although the optical fiber ends 19, 20 lie in only one groove and are not physically held into position by tube 14, the arrows in FIG. 3 indicate the direction of transverse forces holding the fibers within groove 24. These forces arise because the optical fibers 19, 20 tend to lie straight if no other forces are present. Fibers 19, 20 are curved toward groove 24 by tapered rod ends 15, 16. However, groove 24 acts as a constraint keeping fibers 19, 20 from then continuing in a straight line through rods 11, 12. Since the fibers tend to lie in a straight line extending below rods 11, 12 in FIG. 3, the ends of fibers 19, 20 tend to be forced into groove 24, thereby keeping the fiber ends in proper alignment.

After the fiber ends are properly abutted, ultraviolet curable cement 30 within the interior of tube 14 is then cured, fixing the fiber ends in the desired position. If ultraviolet curable cement 30 is used, tube 14 must be transparent to ultraviolet light.

If a tight fit is desired, the diameter of the inner surface of tube 14 may be chosen to be equal to the sum of the diameters of the two first rods 11, 12.

FIG. 4 then shows the completed connector, including contractible member 25 holding the second rods in a fixed position relative to the first rods. Contractible member 25 is a heat shrinkable tubing protecting the connector from outside disturbances.

Other holding means possible for holding the assembly together include adhesive, a tight fitting rigid outer tube, fusing the various rods together, use of elastic bands or o-rings, flexible tubing, or a contracting collet (three jaw chuck).

We claim:

1. A connector for joining optical fibers, comprising:
   (a) a transparent tube having an interior formed by its inner surface;
   (b) two first rods inserted side by side through the interior of the tube, whereby a groove is formed by the outer first rod surfaces;
   (c) two second rods disposed in the groove spaced apart from each other, the end of each second rod furthest from the tube being tapered and disposed outside the tube;
   (d) terminal portions of first and second optical fibers disposed in the groove, a free end of the first optical fiber joined to a free end of the second optical fiber within the tube by a cement cured by ultraviolet light; and
   (e) a first buffer tube circumscribing a portion of the first optical fiber in the groove and a second buffer tube circumscribing a portion of the second optical fiber in the groove, no portion of a buffer tube lying between the tapered ends of the second rods.

2. A connector for joining optical fibers as recited in claim 1, wherein no portion of the second rods is within the interior of the tube.

* * * * *